(12) United States Patent
Guzik et al.

(10) Patent No.: US 7,836,605 B2
(45) Date of Patent: Nov. 23, 2010

(54) PNEUMATICALLY CONTROLLED COUPLING ASSEMBLY

(75) Inventors: Nahum Guzik, Palo Alto, CA (US);
Charles Brice Arnold, Newark, CA (US); Vladimir M. Chevlioukevitch, Santa Clara, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 0 days.

(21) Appl. No.: 12/797,146

(22) Filed: Jun. 9, 2010

(65) Prior Publication Data

US 2010/0257747 A1 Oct. 14, 2010

Related U.S. Application Data

(63) Continuation-in-part of application No. 12/328,517, filed on Dec. 4, 2008, which is a continuation of application No. 11/349,508, filed on Feb. 7, 2006, now Pat. No. 7,467,479.

(60) Provisional application No. 60/651,561, filed on Feb. 10, 2005.

(51) Int. Cl.
*G01D 21/00* (2006.01)

(52) U.S. Cl. .......................... 33/613; 33/645

(58) Field of Classification Search .................. 33/613, 33/644, 645, 623; 324/210, 212
See application file for complete search history.

(56) References Cited

U.S. PATENT DOCUMENTS

| | | | | |
|---|---|---|---|---|
| 4,586,694 A * | 5/1986 | Jones | ...................... | 251/149.2 |
| 5,491,413 A * | 2/1996 | Guzik | ..................... | 324/212 |
| 5,872,451 A * | 2/1999 | Guzik | ..................... | 324/212 |
| 6,158,112 A * | 12/2000 | Kim et al. | .................... | 29/759 |
| 6,453,541 B1 * | 9/2002 | Guthrie et al. | .......... | 29/603.03 |
| 6,771,451 B2 * | 8/2004 | Morris et al. | ................. | 360/75 |
| 6,971,154 B2 * | 12/2005 | Yoo et al. | ............... | 29/603.03 |
| 7,129,702 B2 * | 10/2006 | Mori et al. | .................. | 324/212 |
| 7,141,969 B2 * | 11/2006 | Guzik | ...................... | 324/261 |
| 7,188,402 B2 * | 3/2007 | Ha | ......................... | 29/603.03 |
| 7,295,002 B2 * | 11/2007 | Guzik et al. | ................ | 324/212 |
| 7,467,479 B2 * | 12/2008 | Guzik et al. | .................. | 33/613 |
| 2002/0112342 A1 * | 8/2002 | Guthrie et al. | .......... | 29/603.03 |
| 2004/0130320 A1 * | 7/2004 | Guzik et al. | ............... | 324/210 |
| 2005/0212516 A1 * | 9/2005 | Guzik | ..................... | 324/262 |
| 2007/0018640 A1 * | 1/2007 | Guzik et al. | ............... | 324/212 |
| 2007/0210789 A1 * | 9/2007 | Guzik et al. | ............... | 324/212 |
| 2009/0033063 A1 * | 2/2009 | Groshong et al. | .......... | 280/507 |

* cited by examiner

*Primary Examiner*—Yaritza Guadalupe-McCall
(74) *Attorney, Agent, or Firm*—Pierce Atwood, LLP; Joseph M. Maraia

(57) ABSTRACT

A headstack locator assembly for locating and fixing a headstack on a spinstand and which mitigates the aforementioned prior art limitations. The headstack locator assembly includes a headstack locator received on a fixed locator. The headstack locator connects to a headstack, while the fixed locator is permanently secured to a spinstand. A vacuum is used to clamp the headstack locator to the fixed locator for testing of the headstack. Upon test completion, the headstack locator is released from the fixed locator by applying positive air pressure to the assembly. More generally, an apparatus and methods for generally locating and reversibly, pneumatically coupling various elements to each other.

18 Claims, 17 Drawing Sheets

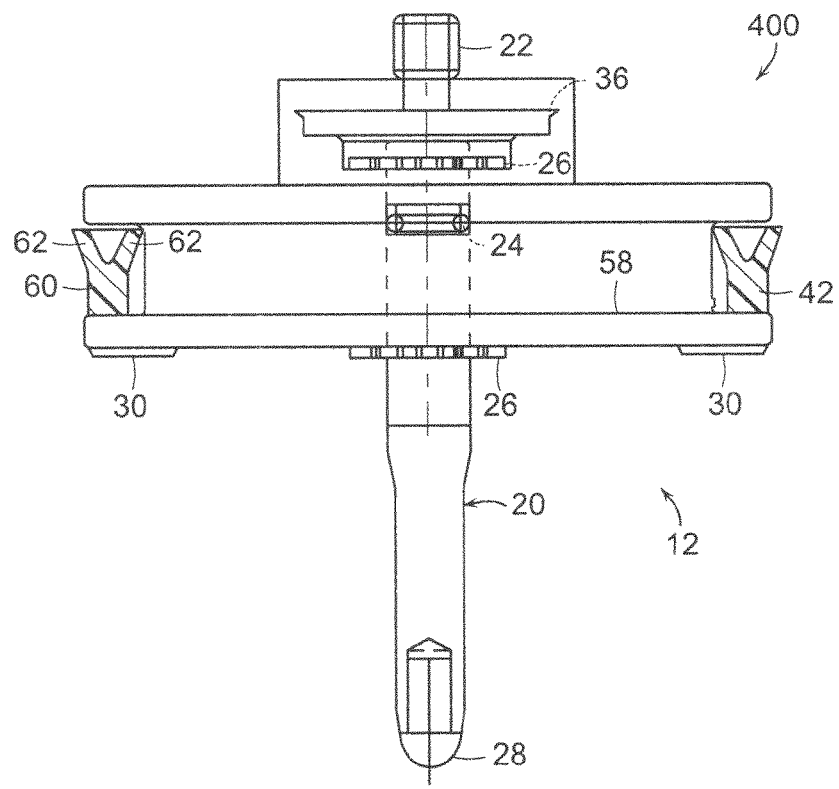
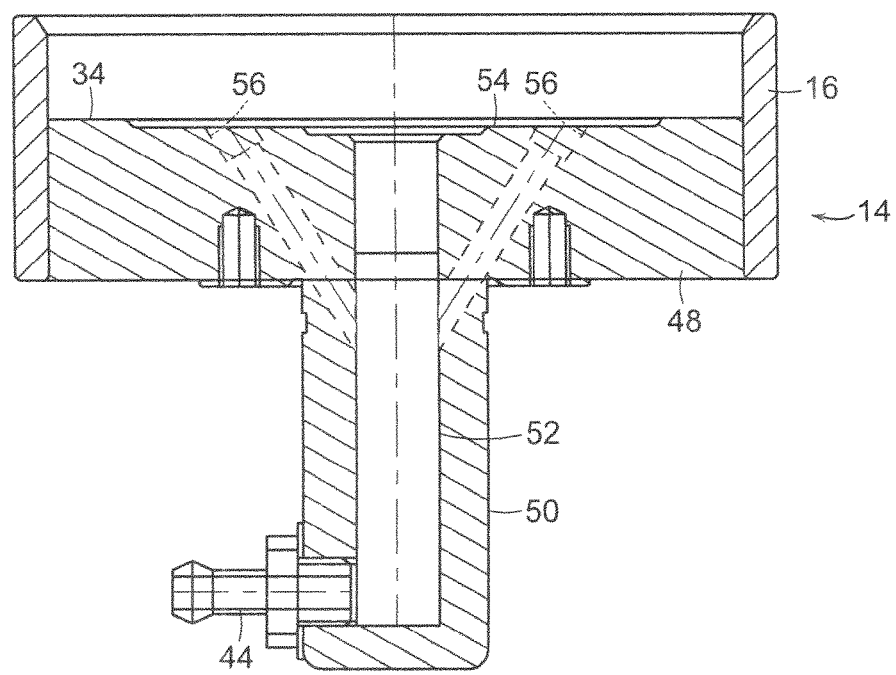
FIG. 18

PNEUMATICALLY CONTROLLED COUPLING ASSEMBLY

RELATED APPLICATIONS

This application is a continuation-in-part of U.S. patent application Ser. No. 12/328,517, filed Dec. 4, 2008, US Patent Publication No. US 2009/0113738, published May 7, 2009, which is a continuation of U.S. patent application Ser. No. 11/349,508, filed Feb. 7, 2006, now U.S. Pat. No. 7,467,479, which claims priority to U.S. Provisional Patent Application Ser. No. 60/651,561 Feb. 10, 2005, now expired; the entire teachings of the above applications are incorporated herein by reference.

FIELD OF THE DISCLOSURE

The present disclosure relates to testing of components of hard drives for computers, and, specifically, it deals with a system for locating and fixing a headstack, which is a part of a hard disk assembly, in a headstack tester. More particularly, the disclosure relates to methods and devices for pneumatically coupling elements or components.

BACKGROUND OF THE DISCLOSURE

Modern computers have hard drives that are made in the form of a headstack and a stack of hard disks. A headstack is an assembly that includes one or more read and write heads, which are stacked in such a manner as to work in conjunction with the pack of hard disks, which are used for data storage. These devices are well known and are used in many data storage applications. The headstacks are manufactured by many companies such as SAE Magnetics, Western Digital (Read-Rite), Hitachi Global Storage Technologies (IBM), Seagate, and others. The headstack is generally mounted on a shaft by means of bearings, which allows the headstack to rotate freely on the shaft. During data storage operations (reading and writing), the magnetic heads are turned on the shaft to position them with respect to the hard disks.

A magnetic head and disk tester is an instrument that is used for testing the characteristics of magnetic heads and disks, such as a signal-to-noise ratio, track profile, etc. The tester simulates those motions of the head with respect to the disk and the same rotational speeds of the disks that occur in an actual hard disk drive during operation. Each tester consists of two components, i.e., a mechanical component, commonly referred to as a spinstand, that performs movements of the head with respect to the disk, and an electronic component that is responsible for measurement, calculation, and analysis of the measured signal. The spinstand is also a mechanical component of a servo-writer, an instrument that is used for writing servo information on a magnetic disk, as well as a component of a flying height tester; an instrument used for measuring the flying height of a head over the disk.

An example of a prior art spinstand for a head and disk tester is illustrated in FIGS. 1 and 2. The spinstand 100 includes a stationary base plate 110 that supports walls 112a, 112b, 112c. The walls 112a, 112b, 112c in turn support a spindle 113 for carrying a disk pack DP disposed in a cylindrical disk pack region including one or more magnetic disks 114, having diameter D, and being coaxial about a disk pack axis DPA. The spindle 113 and the disks 114 are rotated by a spindle motor 115 about a spin axis SA.

The base plate 110 further supports first and second slide motors (not shown). The first slide motor moves a slide 116 along rails 117a, 117b in the Y direction (see FIG. 2). Two additional rails, 118a, 118b, are mounted on top of slide 116. The second slide motor controls movement of a second slide 119 along rails 118a, 118b in the X direction. The first and second motors cooperate to position a headstack 120 mounted on a headstack locator 121 of the slide 119 to a specified location with respect to the center of spindle 113. The headstack 120 carries and positions magnetic head(s) 122 relative to disk(s) 114.

Other examples of prior art spinstands for a head and disk tester include the Guzik V2002 XY-positioning spinstand and the Guzik S-1701 Series Micro Positioning Spinstand, all of which are available from the assignee of the present disclosure, Guzik Technical Enterprises, 2443 Wyandotte Street, Mountain View, Calif. 94043, USA (www.guzik.com).

As the density of magnetic recording increases, additional information tracks are compressed into a given disk area. The decrease in track size heightens the demand for improved accuracy in head positioning. Likewise, the rotational speeds of the magnetic disks increase in order to achieve shorter access times. In addition, more disks are added to the disk stack to provide additional storage.

As the disk(s) rotate, vibrations in both the disks and the magnetic heads may be induced. These vibrations increase track misregistration. In some cases, track misregistration between the disks and the magnetic heads reaches unacceptable levels at which spinstand operation becomes unreliable.

What is still desired is a new and improved apparatus and method for locating and fixing a headstack on a spinstand. Among other aspects and advantages, the new and improved apparatus and method will quickly and accurately locate and secure a headstack to a spinstand for testing, while retaining the reliability and stability of all previous methods.

While the above background discusses coupling elements that are commonly used in headstacks and spinstands, there is a need for apparatus and methods for generally locating and reversibly coupling various elements to each other.

SUMMARY OF THE DISCLOSURE

The present disclosure is directed to a new and improved headstack locator assembly for locating and fixing a headstack on a spinstand and which mitigates the aforementioned prior art limitations. According to one exemplary embodiment of the present disclosure, the new and improved headstack locator assembly includes a headstack locator received on a fixed locator. The headstack locator connects to a headstack, while the fixed locator is permanently secured to a spinstand. A vacuum is used to clamp the headstack locator to the fixed locator for testing of the headstack. Upon test completion, the headstack locator is released from the fixed locator by applying positive air pressure to the assembly.

In one form, the fixed locator includes a fixed locator bushing and a pin receiving aperture. The fixed locator bushing is disposed about and extends transverse to the fixed locator axis. The fixed locator bushing has an upper surface extending transverse to the fixed locator axis.

The pin receiving aperture extends from the fixed locator bushing along the fixed locator axis. The pin receiving aperture has a contour with a circular cross-section having a radius which monotonically decreases from the upper surface of the fixed locator bushing.

The pin receiving aperture extends from a region adjacent to the upper surface of the fixed locator bushing to a port. The port is adapted to receive an applied vacuum and an applied positive pressure.

The headstack locator extends along a headstack locator axis and includes a headstack locator and a locating pin. The headstack locator bushing has an upper surface and a lower surface and is disposed about and extends transverse to the headstack locator axis. The headstack locating bushing has a lower surface extending transverse to the headstack locating axis. The headstack locating bushing has on its upper surface, a coupling assembly for receiving a headstack having a headstack axis, whereby the headstack axis is coaxial with the headstack locator axis.

The locating pin extends from the lower surface of the headstack locator bushing along the headstack locator axis. The locating pin has an outer contour with a circular cross-section having a radius which decreases monotonically from the lower surface. The contour of the locating pin is substantially complimentary to the contour of the pin receiving aperture.

The headstack mounting assembly further includes a sleeve extending along a sleeve axis. The sleeve extends from a peripheral surface of the fixed locator bushing. In alternative embodiments, the sleeve extends from a peripheral surface the headstack locator bushing. In those embodiments, the sleeve axis is coaxial with a corresponding one of the fixed locator axis and the headstack locator axis and the other of the fixed locator bushing and the headstack locator bushing is positionable within the sleeve with the fixed locator axis, the headstack locator axis and the sleeve axis being coaxial when the pin is disposed within the pin receiving aperture.

In a preferred form of the invention, the headstack mounting assembly further includes a seal disposed on one of a peripheral surface of the fixed locator bushing and a peripheral surface of the headstack locator bushing. The seal pneumatically isolates a region between the upper surface of the fixed locator bushing and the lower surface of the headstack locator bushing and within the sleeve. The seal pneumatically couples the region to regions outside the headstack mounting assembly when a positive pressure is applied to the port.

In use, when the pin is disposed within the pin receiving aperture and a vacuum is applied to the port, the static pressure in the region, responsive to the applied vacuum and ambient pressure outside the assembly, biases the head locater bushing toward the fixed locator bushing, thereby coupling the headstack locator to the fixed locator.

When the headstack locator is coupled to the fixed locator in this manner, a positive pressure may be applied to the port, in order to release the headstack locator from the fixed locator. Then, the static pressure in the region, responsive to the positive pressure and ambient pressure outside the assembly, biases the headstack locator bushing away from the fixed locator bushing, thereby decoupling the headstack locator from the fixed locator.

In a preferred form of the invention, the seal is a u-cup wiper seal disposed in a groove in a peripheral surface of the fixed locater bushing. In alternative embodiments, the seal is a U-cup wiper seal disposed in a groove in a peripheral surface of the headstock locator bushing.

In one form of the invention, the channel extends from the port and through the fixed locator bushing, to the region adjacent to the upper surface of the fixed locator bushing. In that form, the material forming a distal tip of the locating pin may be resilient relative to a material forming the pin aperture, thereby effecting an embodiment with minimal wear on the pin and pin aperture over long usage.

In another form of the invention, the channel extends within the locating pin from a distal tip thereof, along the headstack locator axis, to a lateral port in the pin at a region adjacent to the upper surface of the fixed locator bushing.

Among other aspects and advantages, the new and improved assembly quickly and accurately locates and secures a headstack to a spinstand for testing.

The invention is useful generally in many applications, where it is desired to reversibly couple and decouple elements together. Components of headstacks and spinstands discussed above are but examples of such utilities.

The invention can be alternatively described as an assembly for releasably coupling a first element to a second element. The assembly includes a first element surface disposed on the first element, a second element surface disposed on the second element, and a port.

In this general form, the first element defines a cylindrical region disposed about a cylindrical axis orthogonal to the first element surface. That cylindrical region extends to a cylinder end surface transverse to the cylinder axis. The cylindrical region has a cylinder side surface disposed about the cylinder axis and extending from the cylinder and surface.

The second element includes a piston disposed about a piston axis orthogonal to the second element surface. The piston extends to a piston end surface transverse to the piston axis, and has a piston side surface disposed about the piston axis and extending from the piston end surface.

At least one of (i) the first element surface is complementary to the second element surface, and (ii) the cylinder end surface is complementary to the piston end surface. The assembly includes a fluid path extending from the port through one of the (a) piston to the piston end surface, and (b) the cylindrical region to the cylinder end surface. A resilient seal extends from one of the piston side wall and the cylinder side wall.

The piston is sized to be positionable within the cylindrical region with the piston axis being coaxial with, or offset with respect to, the cylinder axis and with the piston end surface being opposite the cylinder end surface, and with the seal extending between the piston side surface and the cylinder side surface. The seal forms a pneumatic seal between a region between the piston end surface and the cylinder end surface, so that the region is pneumatically isolated from points exterior thereto.

The first element surface and the second element surface are sized and disposed on the respective first element and second element, so that when the piston is at least partially disposed in the cylindrical region, at least a portion of the first element surface is opposite at least a portion of the second element surface.

Some forms of the invention further include three pads, each of the pads extending from opposed portions of one of: (i) one of the first element surface and the cylinder end surface, and (ii) one of the second element surface and the piston end surface.

In some forms, the pads have equal heights. In other forms, at least two of the pads have different heights. In some forms, at least one of the pads has an adjustable height.

In some forms, at least one of the first element surface and the second element surface are planar, and in other forms, both of the first element surface and the second element surface are planar.

In one form of the invention, the assembly of the invention, further includes an alignment assembly having a first component extending from one of the first element surface and the cylinder end surface along a first alignment axis parallel to the cylinder axis, and a second component extending from one of the second element surface and the piston end surface along a second alignment axis parallel to the piston axis In this form, when the piston is at least partially in the cylinder region, with the piston axis being substantially coaxial with the cylinder axis, and having a predetermined angular orientation with respect to the piston axis and the cylinder axis, the first alignment axis and the second alignment axis are substantially coaxial. Also, the first component and the second component are shaped to interface when the first alignment axis and the second alignment axis are substantially coaxial.

In one form of the invention, the first element surface is parallel to the second element surface when the piston axis and the cylinder axis are coaxial, and the first element surface comprises the cylinder end surface and the second element surface comprises the piston end surface.

In another form of the invention, the first element surface is parallel to the second element surface when the piston axis and the cylinder axis are coaxial, the first element surface extends outward from an end of the cylindrical region opposite the cylinder end surface, and the second element surface extends outward from an end of the piston opposite the piston end surface.

One form of the invention includes three pads, each of the pads extending from opposed portions of one of: (i) one of the first element surface and the cylinder end surface, and (ii) one of the second element surface and the piston end surface, and further includes a controller for selectively applying a negative pressure relative to ambient pressure, and a positive pressure relative to ambient pressure, to the port. In this form, when the first element and the second element are positioned whereby the first element surface is opposite the second element surface, with the piston disposed at least partially within the cylindrical region, and the negative pressure is applied to the port, the first element surface and the second element surface are drawn towards each other in response to the applied negative pressure and the three pads maintain separation of the surfaces through interfering engagement of each of the pads with one of the first element surface and the second element surface, thereby coupling the first element and the second element. In this form, when in the first element and the second element are positioned whereby the first element surface is opposite the second element surface, with the piston disposed at least partially within the cylindrical region and the three pads maintain separation of the surfaces, and the positive pressure is applied to the port, the first element surface and the second element surface are driven away from each other in response to the applied positive pressure, thereby decoupling the first element and the second element.

BRIEF DESCRIPTION OF THE DRAWINGS

The foregoing and other objects, features and advantages of the present disclosure will be apparent from the more particular description of exemplary embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 18 is an exploded side elevation view, partially in section, of another exemplary embodiment of an assembly constructed in accordance with the present disclosure for locating and fixing a headstack on a spinstand, and including a headstack locator received on a fixed locator;

FIGS. 20A, 20B and 20C show an alternative exemplary embodiment of a coupling assembly of the invention, in which FIG. 20A shows first and second elements of that assembly from a point offset from and above the assembly, FIG. 20B shows a side elevation of the first and second elements of that assembly, and FIG. 20C shows first and second elements of that assembly from a point offset from and below the assembly.

DETAILED DESCRIPTION OF EXEMPLARY EMBODIMENTS

Figure 13:
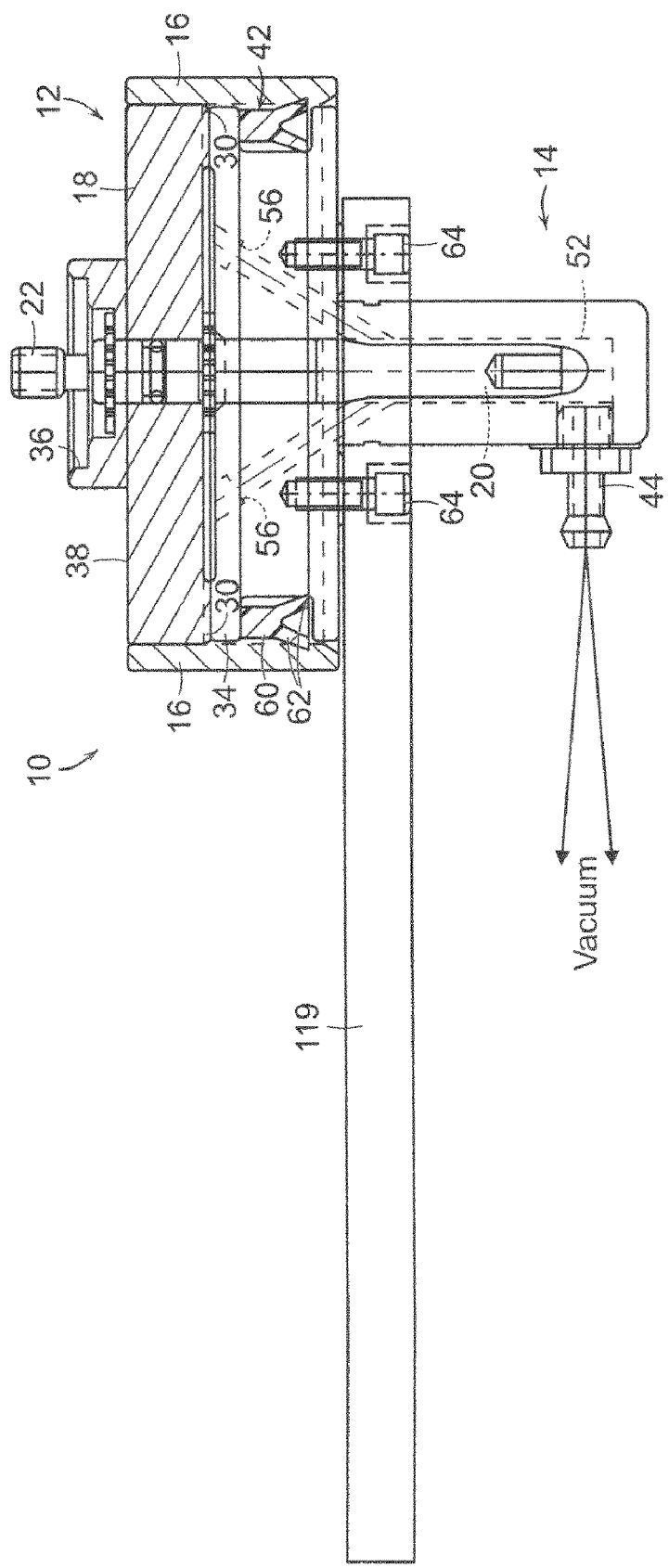
FIG. 13 is a side elevation view, partially in section, of the assembly of FIG. 3 showing the headstack locator received on and being secured to the fixed locator via the application of a vacuum to the fixed locator.
Figure 14:
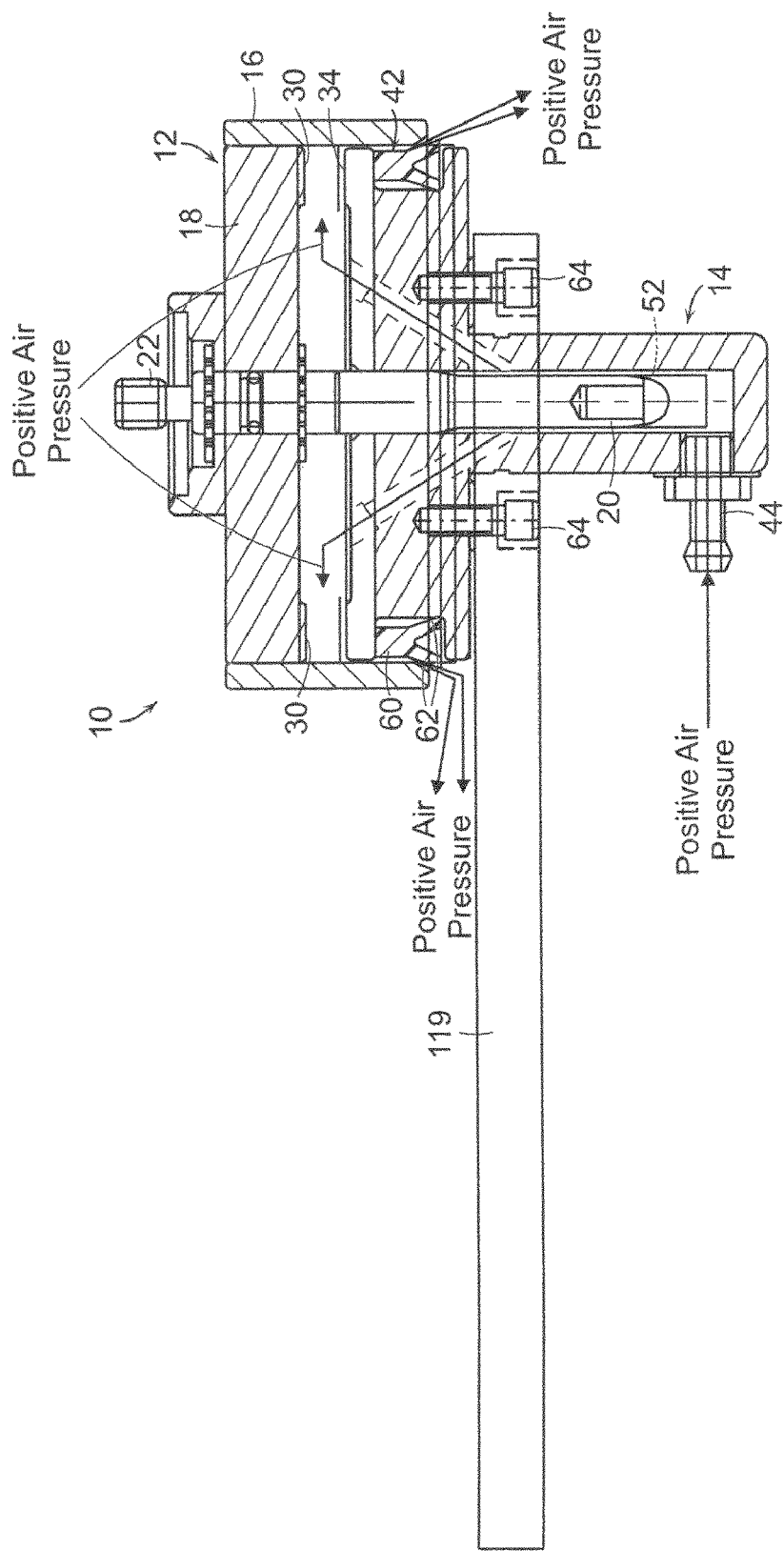
FIG. 14 is a side elevation view, partially in section, of the assembly of FIG. 3 showing the headstack locator received on the fixed locator and being released from the fixed locator via the application of positive pressure to the fixed locator.
Figure 15:
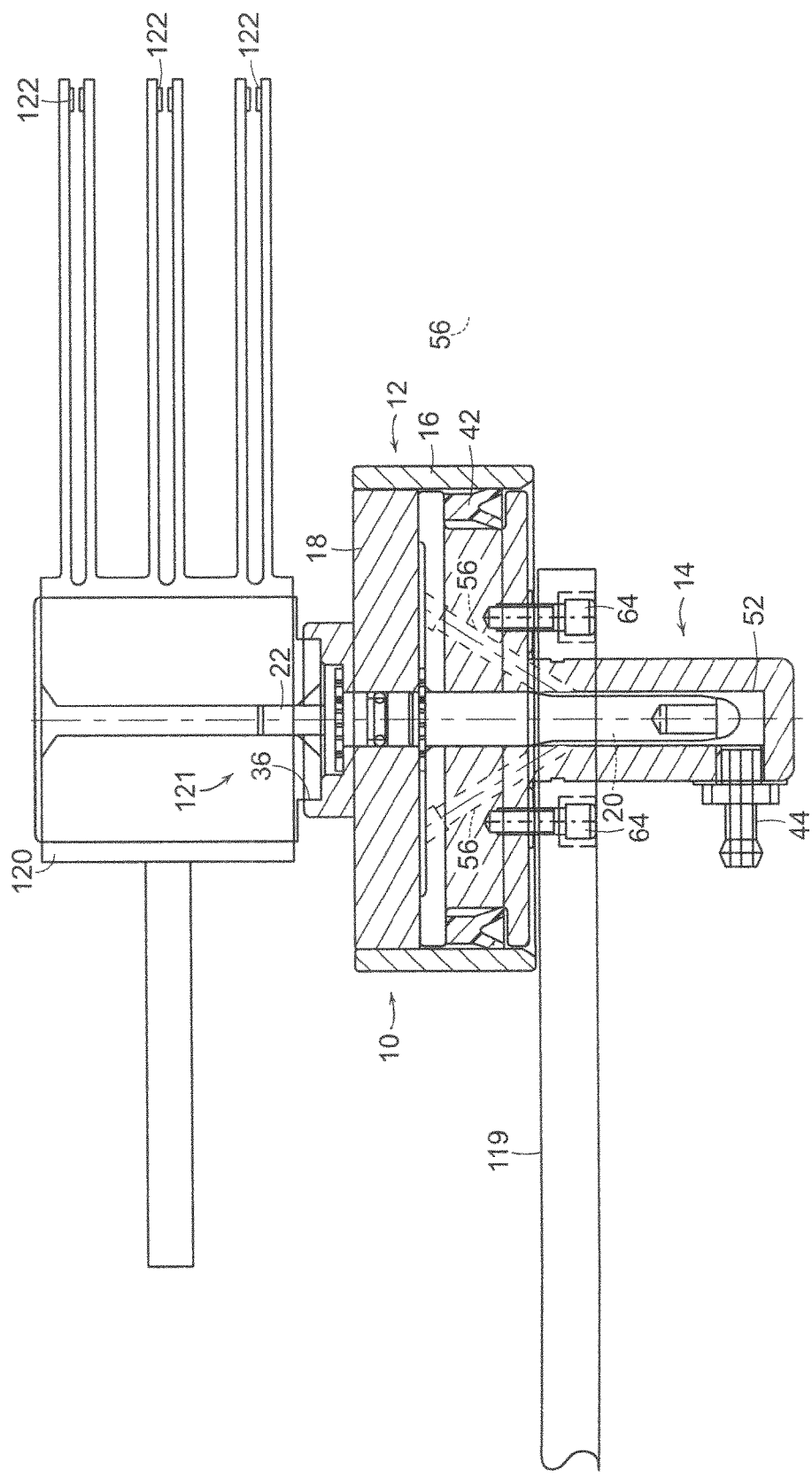
FIG. 15 is a side elevation view, partially in section, of the assembly of FIG. 3 showing the headstack locator received on and being secured to the fixed locator via the application of a vacuum, and wherein an exemplary embodiment of a headstack is shown secured to the headstack locator.

Referring first to FIGS. 3 and 12-15, there is shown an exemplary embodiment of an assembly 10 constructed in accordance with the present disclosure for locating and fixing a headstack on a spinstand. The assembly 10 includes a headstack locator 12 received on a fixed locator 14. The headstack locator 12 connects to a headstack 120 (as shown in FIG. 15 for example), while the fixed locator 14 is permanently secured to a slide 119 of a spinstand. A vacuum is then used to clamp the headstack locator 12 to the fixed locator 14 for testing of the headstack 120. Upon test completion, the headstack locator 12 is released from the fixed locator 14 by applying positive air pressure to the assembly 10.

Among other aspects and advantages, the new and improved assembly 10 quickly and accurately locates and secures a headstack to a spinstand for testing.

Figure 1:
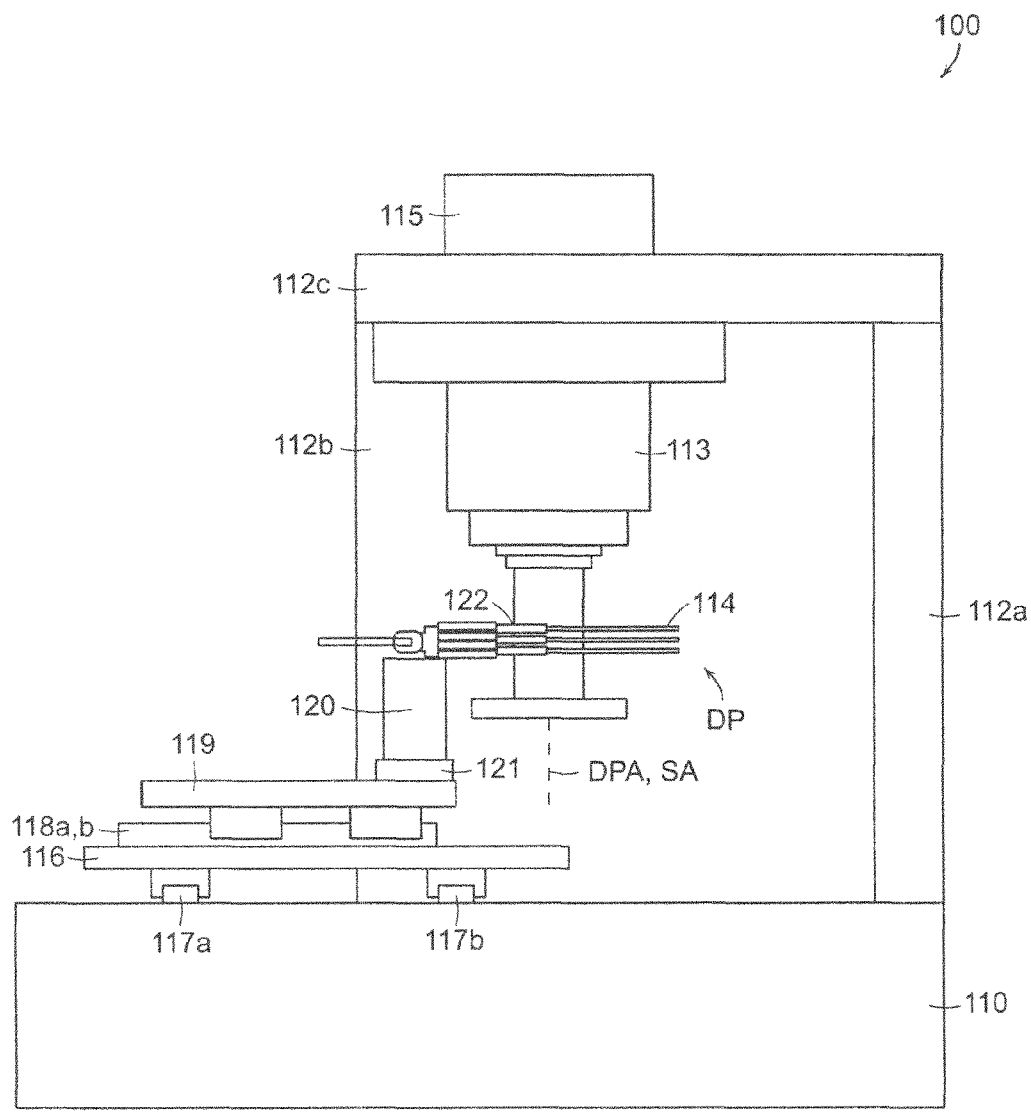
FIG. 1 is a schematic front view of a prior art spinstand.
Figure 2:
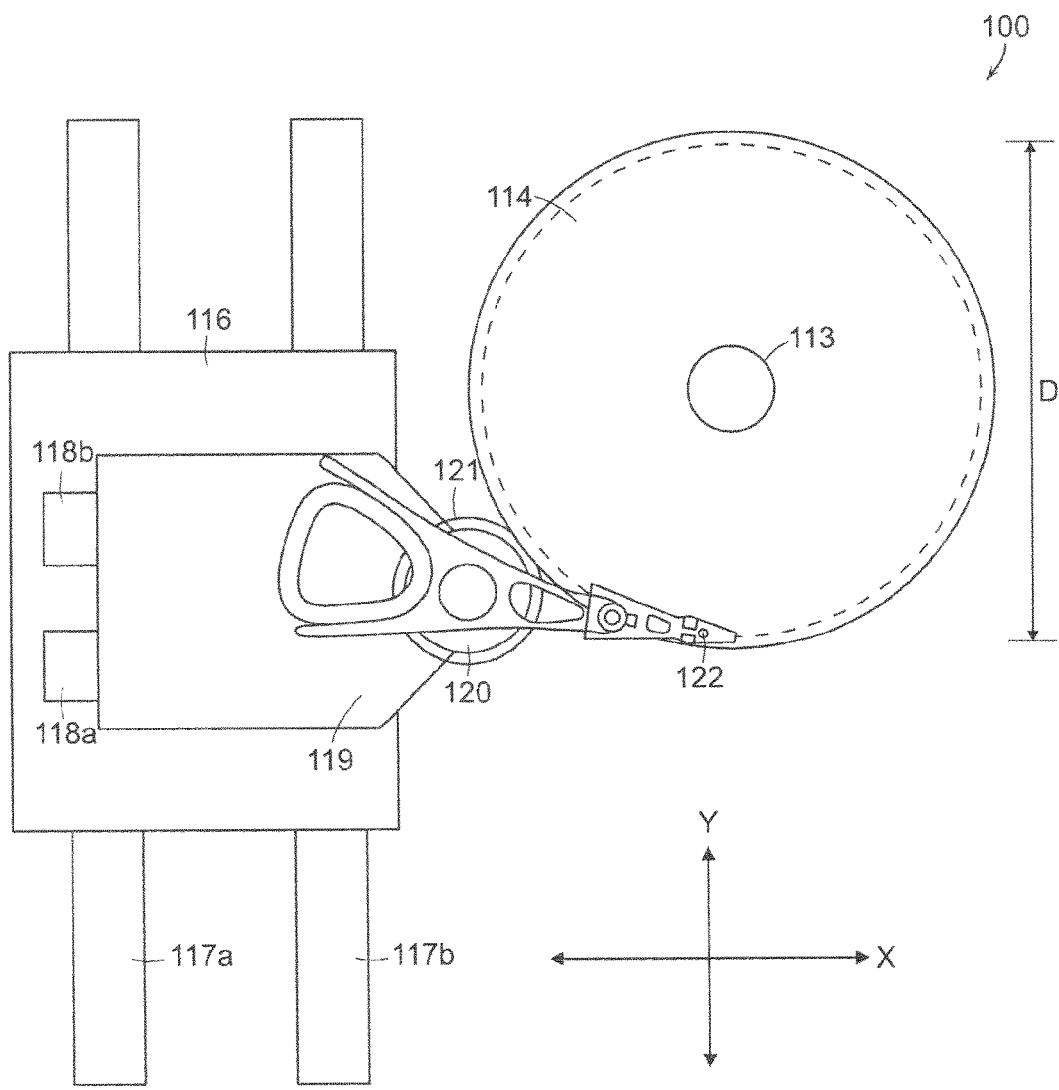
FIG. 2 is a schematic top view of the spinstand in FIG. 1.
Figure 3:
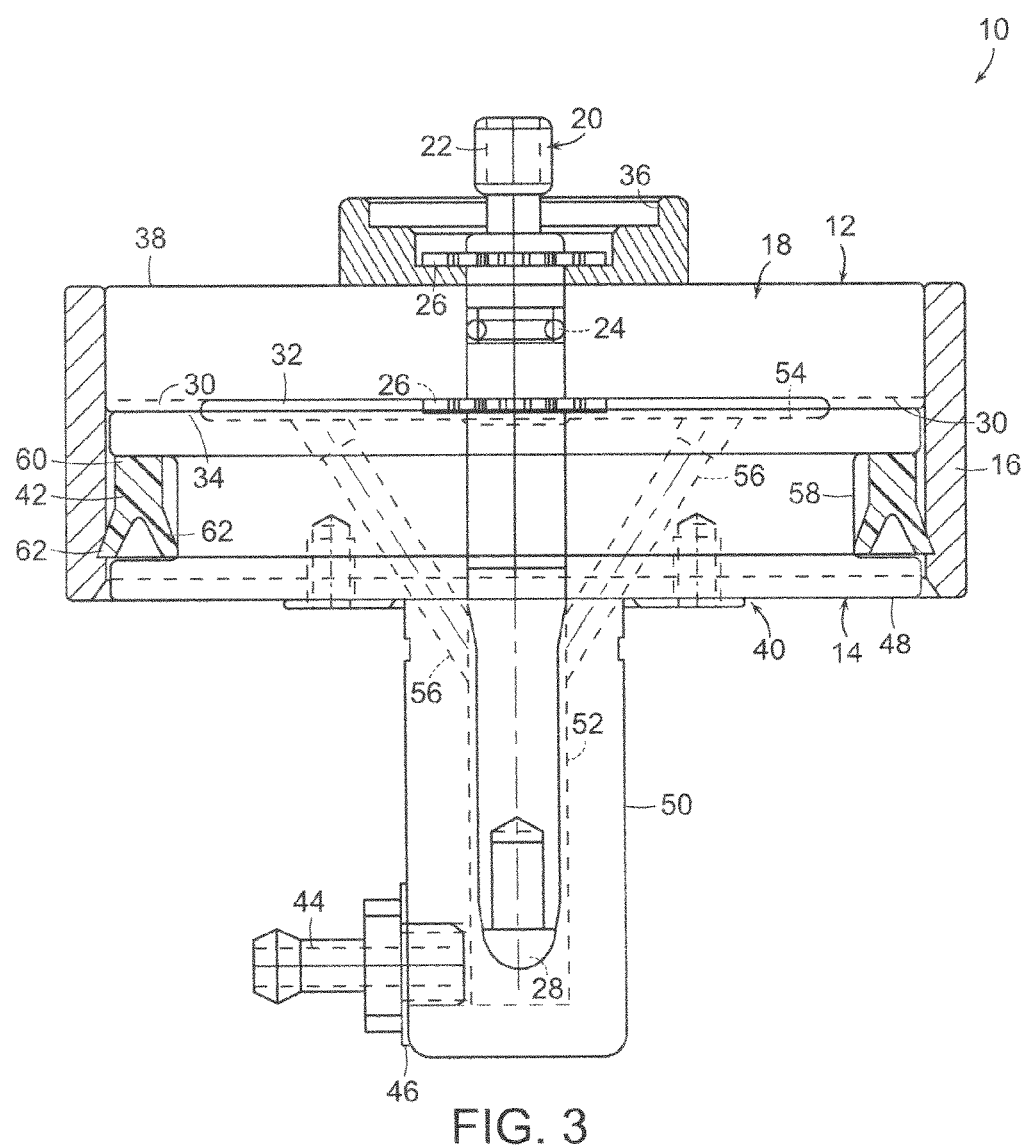
FIG. 3 is a side elevation view, partially in section, of an exemplary embodiment of an assembly constructed in accordance with the present disclosure for locating and fixing a headstack on a spinstand, and including a headstack locator received on a fixed locator.
Figure 4:
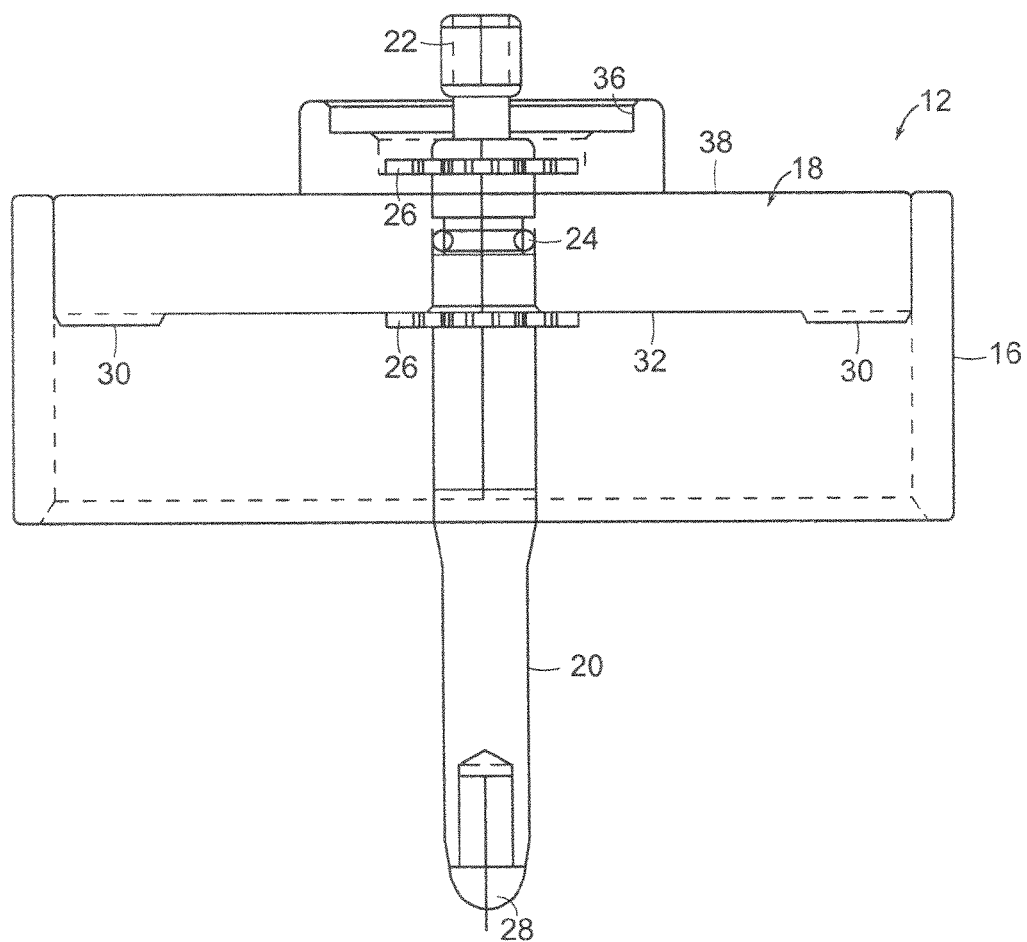
FIG. 4 is a side elevation view of the headstack locator of FIG. 3.
Figure 5:
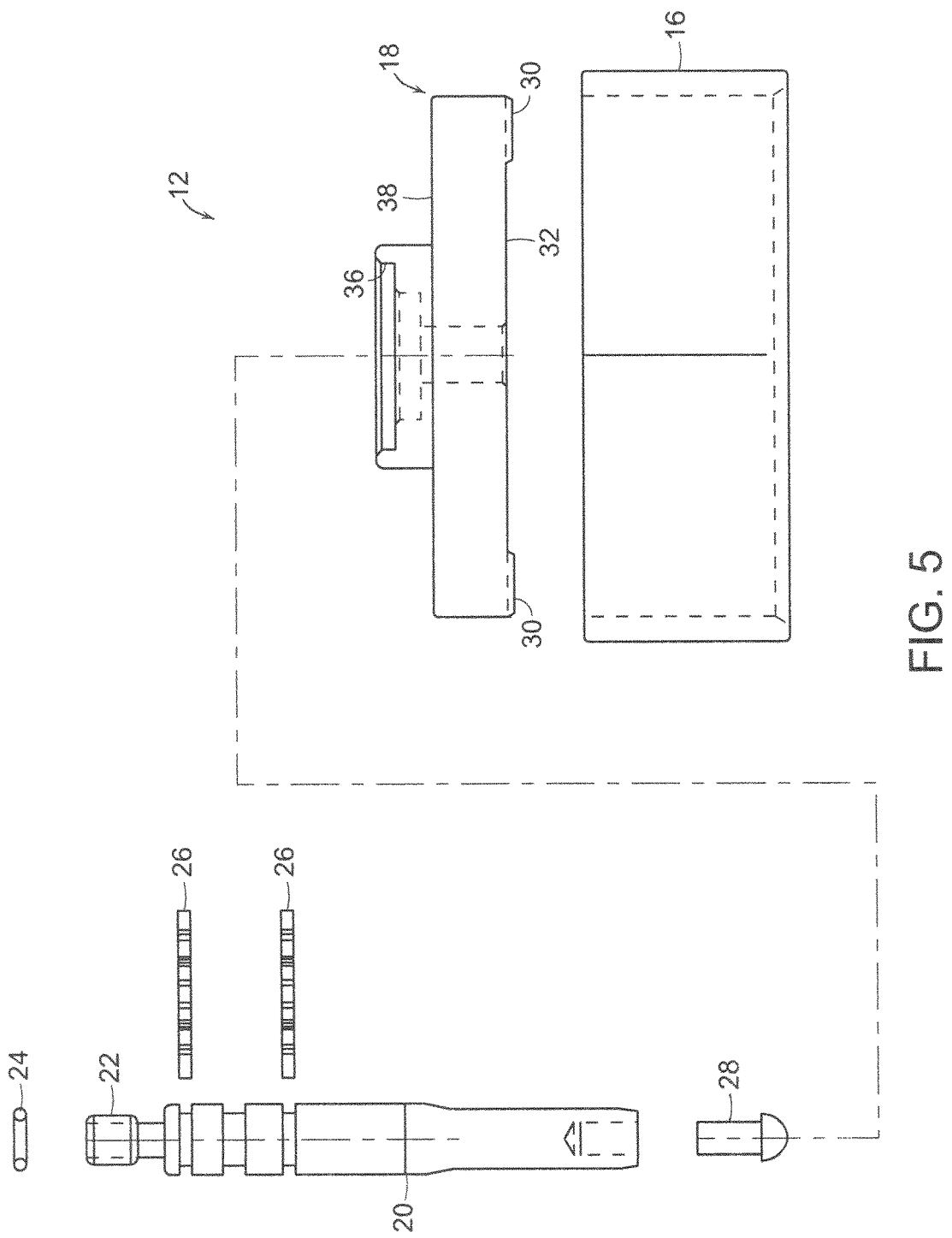
FIG. 5 is an exploded, side elevation view of the headstack locator of FIG. 3.

Referring to FIGS. 3-5, the main components of the headstack locator 12 include a piston ring 16 receiving a bushing 18, which in turn receives a locating pin 20 through a central opening. The locating pin 20 includes means at one end for attaching to a headstack. In the exemplary embodiment shown, the means comprises a threaded portion 22. The threaded portion 22 screws into a pivot bearing 121 of a headstack 120 to secure the headstack to the headstack locator 12, as shown best in FIG. 15. The other end of the pin 20 is used to easily guide and accurately locate, without binding, the headstack locator 12 into the fixed locator 14, as shown in FIGS. 3 and 12-15. The bushing 18 is secured to the piston ring 16 in a suitable manner, such as by being press fit into the ring. The piston ring 16 functions as the sealing/bearing surface between the headstack locator 12 and the fixed locator 14, as shown in FIG. 3.

The headstack locator 12 also includes an O-ring 24 that provides a seal between the locating pin 20 and the bushing 18. The locating pin 20 is held in place with two retaining clips 26, which sandwich the bushing 18 onto the locating pin 20. By using the O-ring 24 and retaining clips 26 for locating the pin to the headstack bushing, the locating pin is allowed to rotate. This prevents over-tightening of the locating pin 20 which can cause damage to the headstack. In an alternative embodiment, the locating pin 20 can be fixed to the bushing 18, by being press-fit or glued to the bushing, without having the ability to rotate in the headstack bushing 18. This alternative embodiment would not use the O-ring or retaining clips.

A plastic button 28 is glued into the tip of the locating pin 20 to protect the mating surfaces of the locating pin 20 and the fixed locator 14. A portion of the locating pin 20 is narrowed near the tip to easily guide the locating pin 20 into the bore of the fixed locator 14 without binding.

Figure 8:
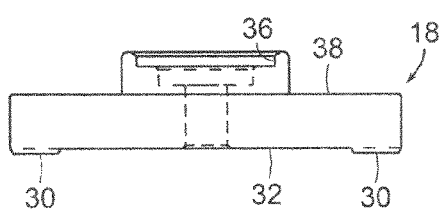
FIG. 8 is a side elevation view of a bushing of the headstack locator of FIG. 3.
Figure 10:
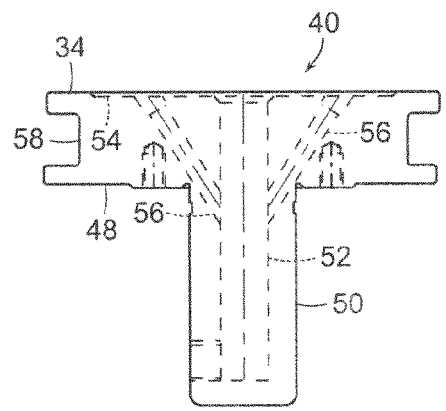
FIG. 10 is a side elevation view of a bushing of the fixed locator of FIG. 3.
Figure 9:
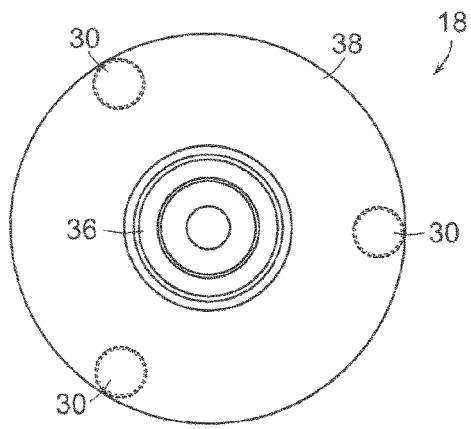
FIG. 9 is a top plan view of the bushing of the headstack locator of FIG. 3.
Figure 11:
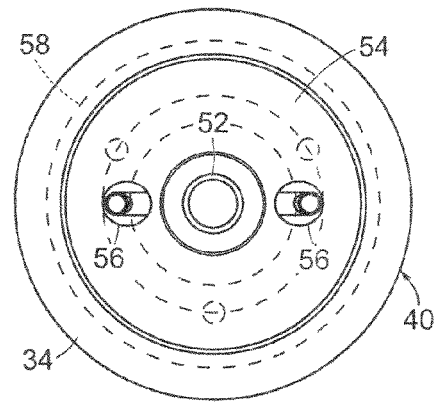
FIG. 11 is a top plan view of the bushing of the fixed locator of FIG. 3.
Figure 12:
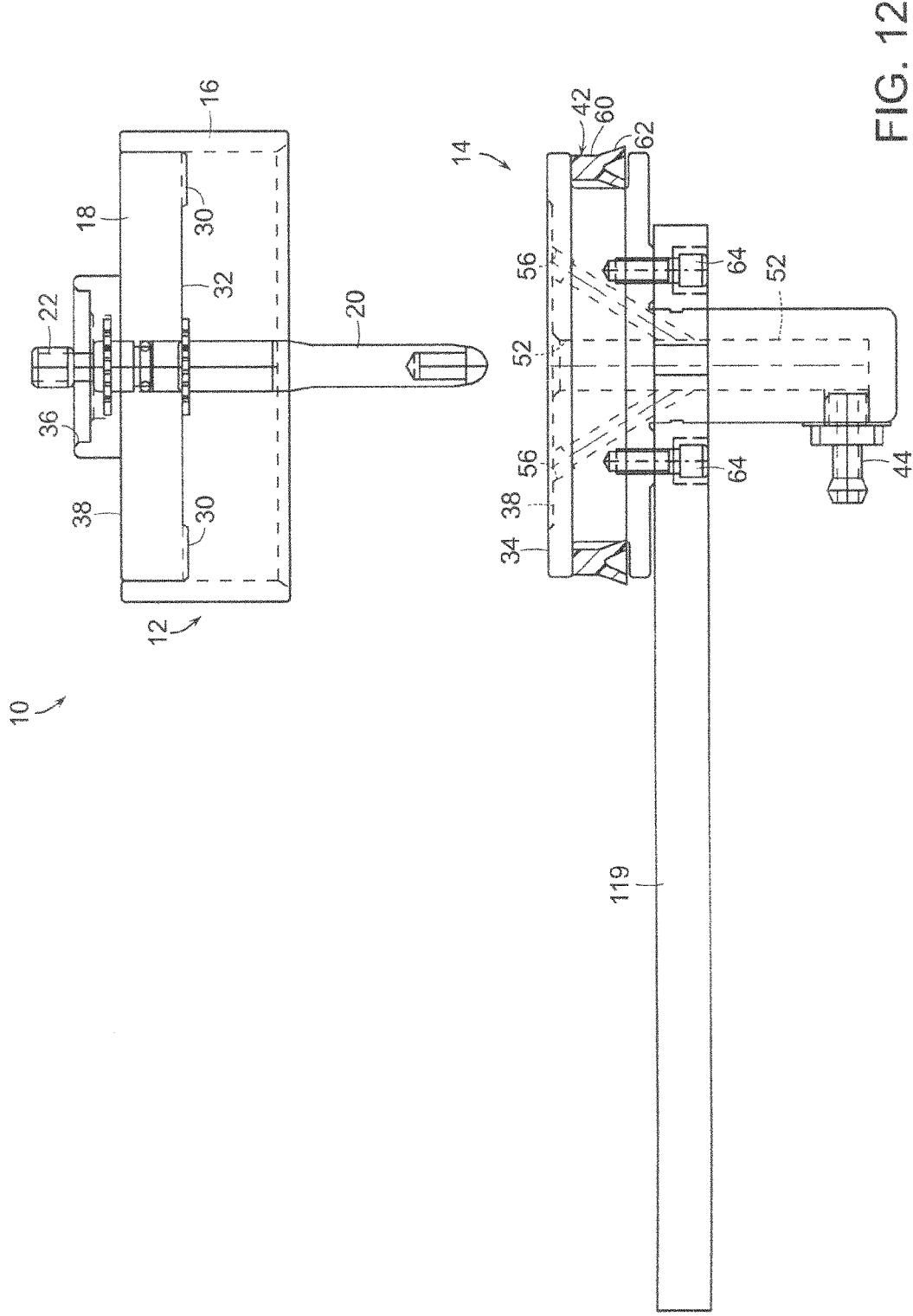
FIG. 12 is a side elevation view of the assembly of FIG. 3 showing the fixed locator secured to a slide of a spinstand and the headstack locator prior to being received on the fixed locator.

The bushing 18 of the headstack locator 12 is also shown in FIGS. 8 and 9. The bushing 18 of the headstack locator 12 includes an annular cup 36 on a top face 38 of the bushing for receiving a headstack 120, as shown in FIG. 15. As shown best in FIG. 9, the bushing 18 also has equally spaced pads 30 on a bottom face 32 thereof. The pads 30 define a height and parallelism of the headstack locator 12 with respect to a top face 54 of a bushing 40 of the fixed locator 14. The pads 30 are received against a top annular surface 34 of the bushing 40 of the fixed locator 14. By using equally spaced pads 30 instead of a solid surface, the headstack locator 12 is less likely to rock due to mating surface scratches or imperfections. In the exemplary embodiment shown, the headstack locator 12 is provided with three of the equally spaced pads 30. In an alternative embodiment, the annular surface is provided on the bushing 18 of the headstack locator 12 while the pads 30 are provided on the fixed locator 14.

Figure 6:
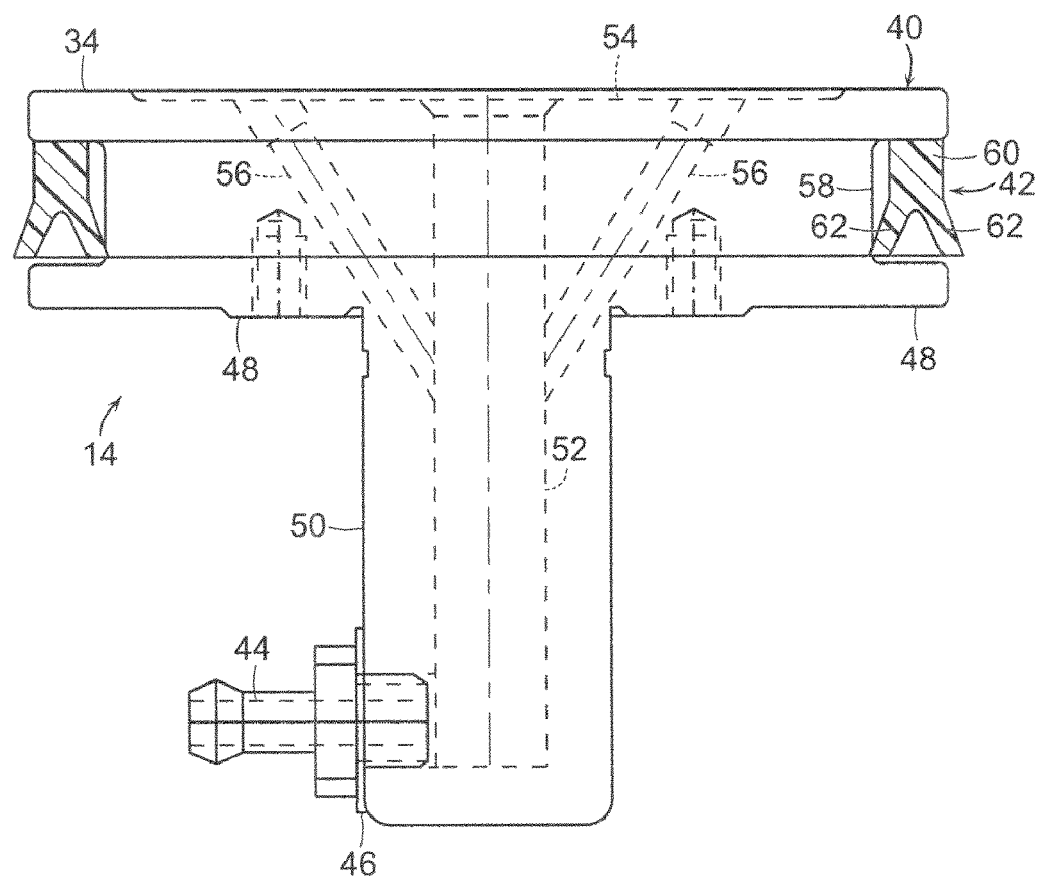
FIG. 6 is a side elevation view, partially in section, of the fixed locator of FIG. 3.
Figure 7:
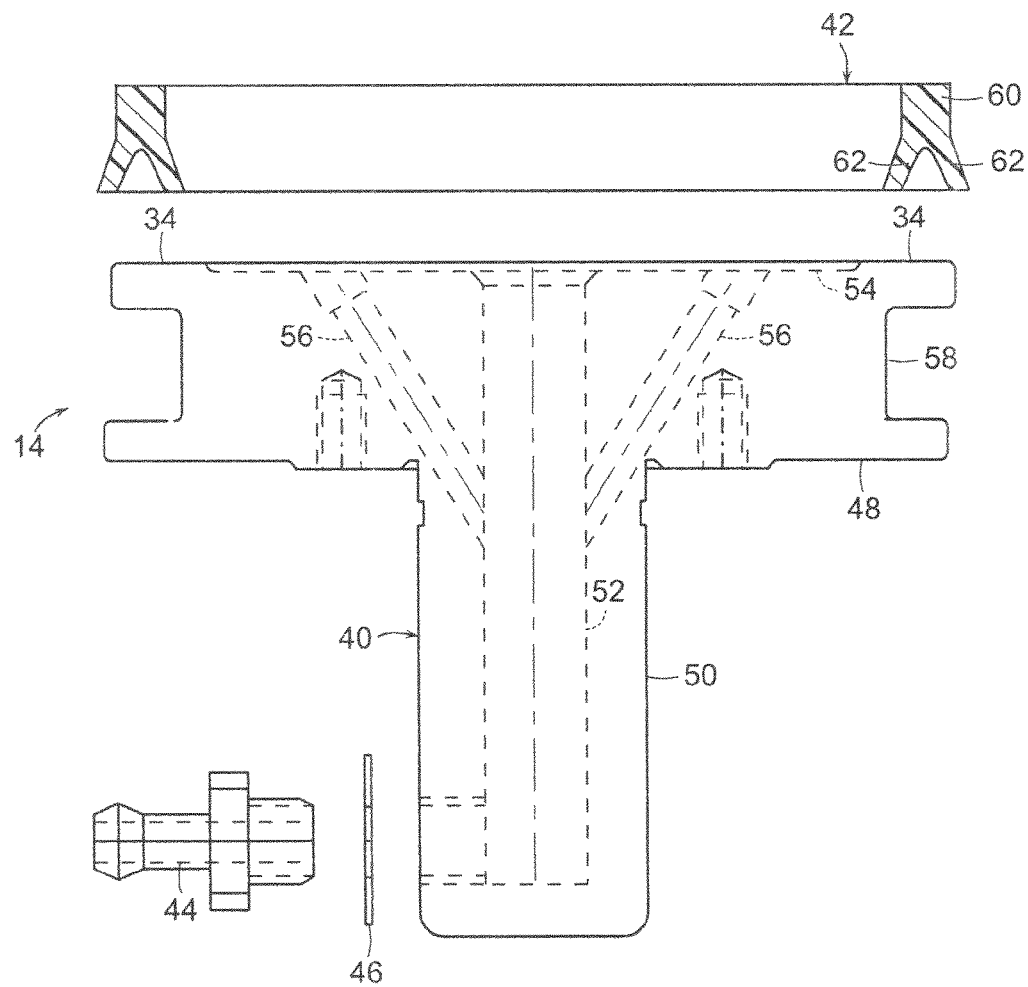
FIG. 7 is an exploded, side elevation view, partially in section, of the fixed locator of FIG. 3.

Referring to FIGS. 12-15, the fixed locator 14 is secured to a slide 119 of a spinstand, with bolts 64 for example. As shown in FIGS. 3, 6, and 7, the fixed locator 14 includes a bushing 40, a wiper seal 42, a pneumatic barb fitting 44, and a washer seal 46 for the barb fitting. The bushing 40 includes a head 48 and a neck 50. The barb fitting 44 is screwed into the neck 50 of the bushing 40. From the fitting, vacuum is drawn and positive air pressure is applied to a centrally located bore 52 of the bushing 40 of the fixed locator 14. The central bore 52 extends to a top face 54 of the bushing 40 and provides two functions: delivery of negative and positive air pressure to the face 54 of the bushing, and as a receptacle for receiving the locating pin 20 of the headstack locator 12. The head 48 and neck 50 of the bushing 40 also define two ports 56, which are cross-drilled from the top face 54 to the central bore 52. The ports 56 allow vacuum/pressure to be applied more evenly to the entire top face 54.

Figure 16:
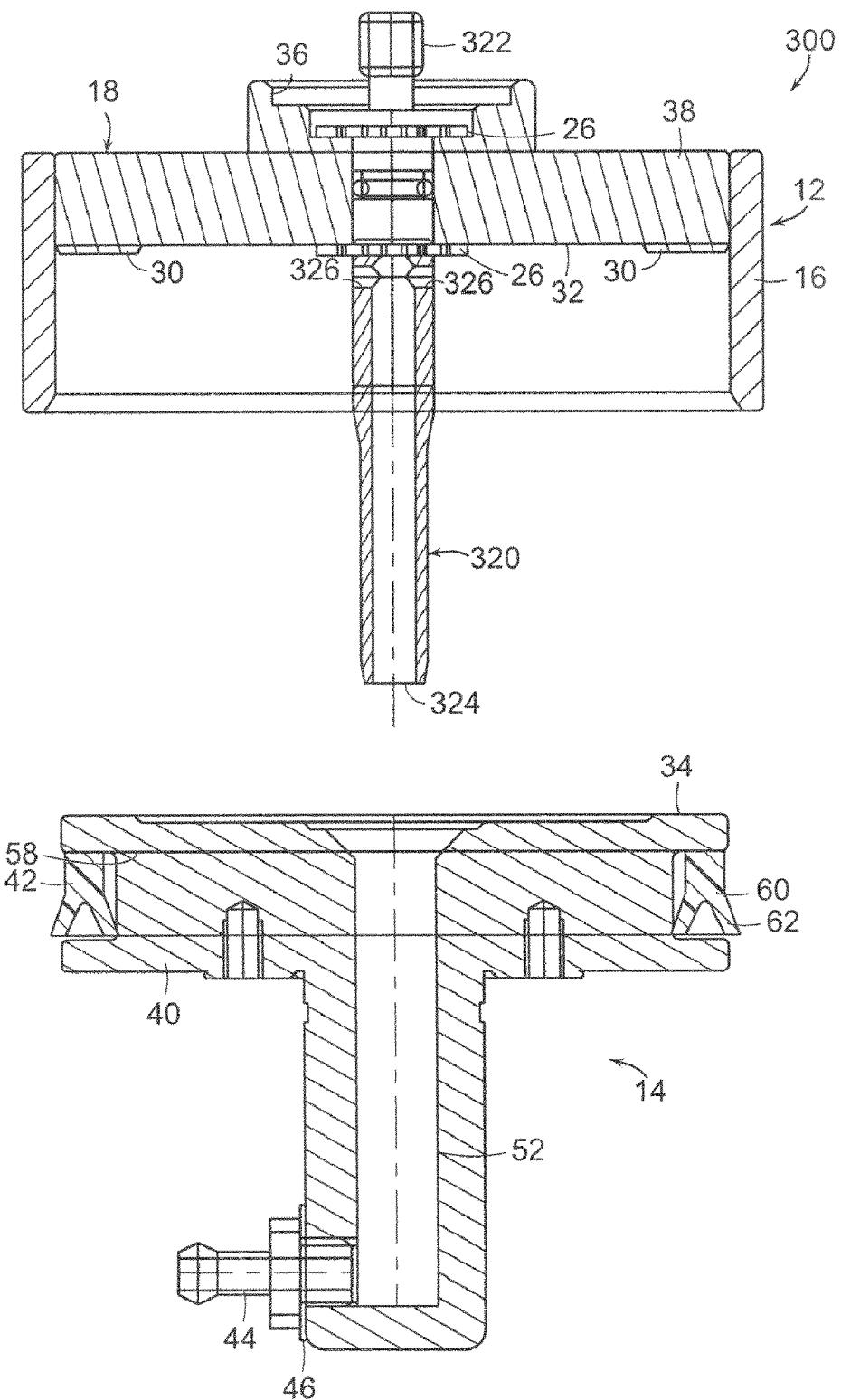
FIG. 16 is an exploded sectional view of another exemplary embodiment of an assembly constructed in accordance with the present disclosure for locating and fixing a headstack on a spinstand, and including a headstack locator received on a fixed locator.
Figure 17:
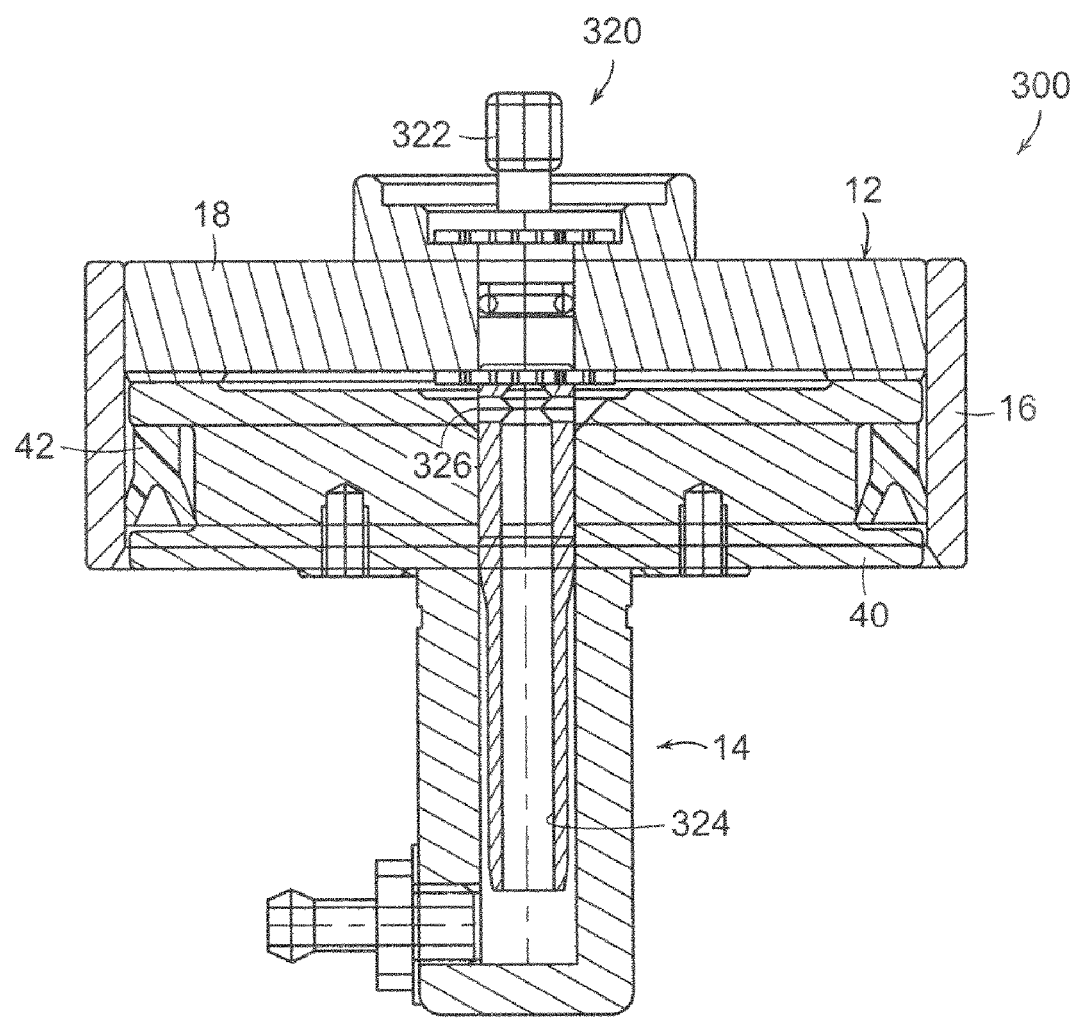
FIG. 17 is an assembled sectional view of the headstack locator of FIG. 16.

In an alternative embodiment 300 shown in FIGS. 16 and 17, the head 48 and neck 50 of the bushing do not define two ports that are cross-drilled from the top face 54 to the central bore 52. Instead the assembly 300 has a locating pin 320 defining a central port 324 extending upwardly from a tip of the pin (other pin 320 also includes a threaded portion 322 at a top end for attachment to a headstack). The pin 320 also defines two ports 326 cross drilled to the center port 324. The ports 324, 326 deliver positive and negative air pressure from the barb fitting 44 to the space located between the bushings 18, 40.

Figure 19:
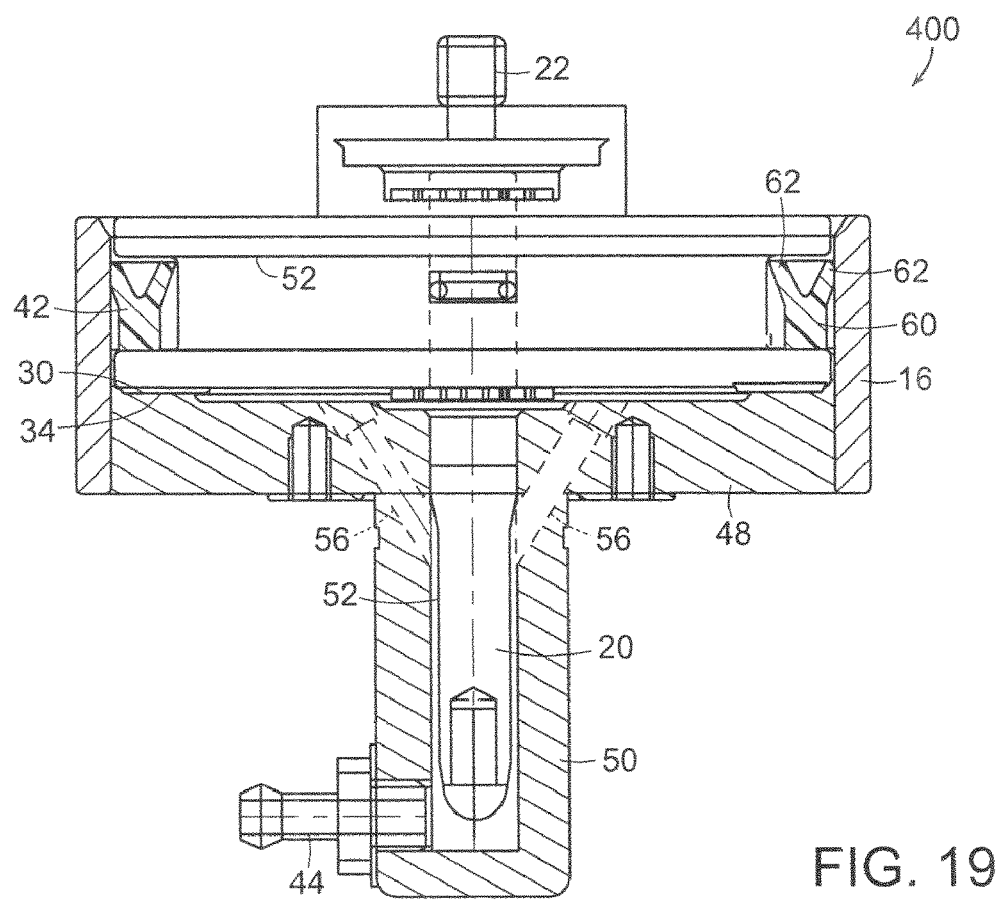
FIG. 19 is an assembled side elevation view, partially in section, of the headstack locator of FIG. 18.

The wiper seal 42 is received in a circumferential groove 58 in a side wall of the head 48 of the bushing 40 of the fixed locator 14. The wiper seal 42 creates a seal between the side wall of the bushing 40 and an inner surface of the piston ring 16 of the headstack locator 12. In the exemplary embodiment shown, the wiper seal comprises a U-cup wiper seal 42. As shown in FIGS. 3, 6, 7, and 12-14, the U-cup wiper seal 42 has a Y-shaped cross-section including a base portion 60 and two arms 62 extending from the base portion. One of the arms 62 is biased against the circumferential groove 58 of the head 48 of the bushing 40 of the fixed locator 14, while the other arm 62 is biased against the piston ring 16 of the headstack locator 12 when the headstack locator 12 is received over the fixed locator 14. The arms 62 are shaped and adapted to provide an air-tight seal between the headstack locator 12 and the fixed locator 14 when a vacuum is applied to the fixed locator 14 in order to secure the headstack locator 12 onto the fixed locator 14. The arms 62 are also shaped and adapted to eventually break the seal between the headstack locator 12 and the fixed locator 14 when positive air pressure is applied through the fixed locator 14 to release the headstack locator 12 from the fixed locator 14. The collapsing of arms 62 of the seal 42 reduces the friction between the seal 42 and the piston ring 16. In doing so, the number or particles generated from the seal 42 due to friction is reduced. In an alternative embodiment 400, as shown in FIGS. 18-19, the seal 42 can be located on the headstack locator 12 and the piston ring 16 can be located on the fixed locator 14.

The headstack locator 12 functions as a quick and accurate interface between a headstack and a spinstand test fixture. The fixed locator 14 functions as an accurate locating device for the headstack locator 12. Negative (vacuum) and positive air pressure is used to lock and release, respectively, the headstack locator 12 to the fixed locator 14. During normal operation, the headstack locator 12 is assembled to a headstack. The headstack locator 12 is then inserted onto the fixed locator 14 by guiding the locating pin 20 into the central bore of the fixed locator 14. The U-cup wiper seal 42 is designed, such that at ambient pressures, the locating piston sleeve 16 easily slides over the U-cup/wiper seal 42. Vacuum to the fixed locator 14 is then turned on and the headstack locator 12 is locked onto the fixed locator 14 by the vacuum. Application of the vacuum to the fixed locator 14 is illustrated in FIG. 13.

When the vacuum is turned off the headstack locator 12 is difficult to remove from the fixed locator 14. To release the headstack locator 12, positive air pressure is applied through the fixed locator 14, such that the headstack locator 12 elevates from the fixed locator 14 and allows an operator to easily remove the headstack locator 12. The airflow is controlled such that the headstack locator 12 safely releases from the fixed locator 14 without fully ejecting. Application of the positive air pressure to the fixed locator 14 is illustrated in FIG. 14.

Described more generally, the assembly 10 of FIGS. 3 and 12-15 is an assembly for releasably coupling a first element 12 to a second element 14. The assembly 10 includes the first element 14, the second element 14, and the port 44. The first element 14 defines a cylindrical region C disposed about a cylinder axis CA and extending to a cylinder end 32 surface transverse to the cylinder axis CA, and having a cylinder side surface 16 disposed about the cylinder axis CA and extending from the cylinder end surface 32.

The second element 12 defines a piston 40 disposed about a piston axis PA and extending to a piston end surface 54 transverse to the piston axis PA, and having a piston side surface 58 disposed about the piston axis PA and extending from the piston end surface 58.

Preferably, but not necessarily, the cylinder end surface 32 is complementary to the piston end surface 54. The first element 14 includes a fluidic path 56 extending from the port 44 through one of the (a) piston 40 to the piston end surface 54 and (b) the cylindrical region C to the cylinder end surface 32.

The piston 40 includes a resilient seal 42 extending from one of the piston side wall 58 and the cylinder side wall 16.

The piston 40 is sized to be positionable within the cylindrical region C with the piston axis PA being coaxial with, or offset with respect to, the cylinder axis CA and with the piston end surface 54 being opposite the cylinder end surface 32, and with the seal 42 extending between the piston side surface 54 and the cylinder side surface 32, thereby forming a pneumatic seal between a region between the piston end surface 54 and the cylinder end surface 32, whereby that region is pneumatically isolated from points exterior thereto.

The first element 14 and the second element 12 are sized whereby when the piston 40 is at least partially disposed in the cylindrical region C, at least a portion of the piston end surface 54 is opposite at least a portion of the cylinder end surface 32.

In various embodiments, the assembly 10 may further include three pads 30, each of the pads extending from opposed portions of one of (i) the cylinder end surface 32, and (ii) the piston end surface 54.

Figures 20A, 20B, 20C:
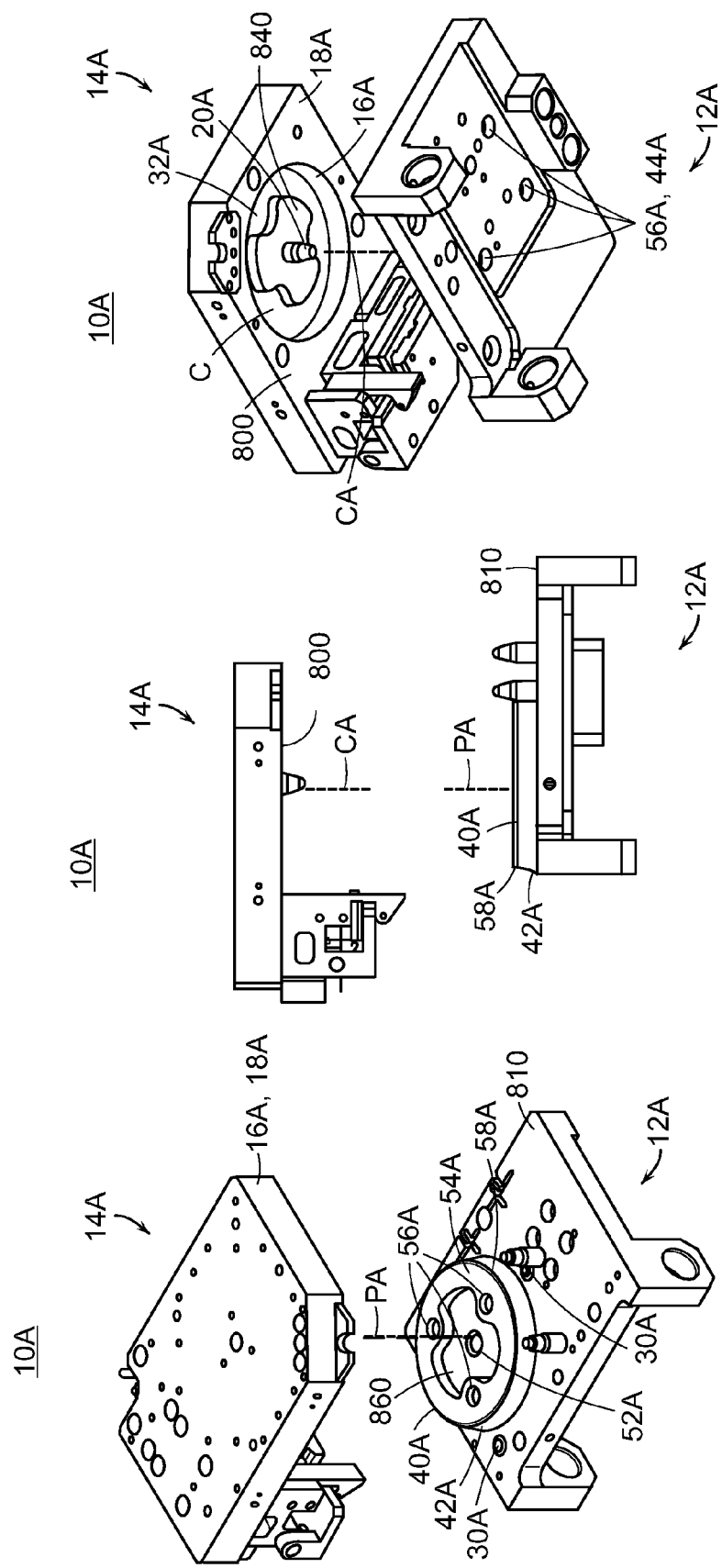

FIGS. 20A, 20B and 20C show an alternative exemplary embodiment of a general coupling assembly 10A of the invention, in which FIG. 20A shows a first element 14A and a second element 12A of that assembly from a point offset from and above the assembly, FIG. 20B shows a side elevation of the first element 14A and the second element 12A of that assembly, and FIG. 20C shows the first element 14A and the second element 12A of that assembly from a point offset from and below the assembly. In FIGS. 20A, 20B and 20C, elements which correspond to elements in the exemplary embodiment of FIGS. 3 and 12-15, are identified with the same reference designations, and having the suffix "A".

In FIGS. 20A, 20B and 20C, the first element 14A includes an open-faced interior cylindrical region C, corresponding to that defined by elements 16 and 18 in the embodiment of FIGS. 3 and 12-15. The cylindrical region C is bounded by cylindrical sidewall 16A disposed about a cylinder axis CA. In FIGS. 20A, 20B and 20C, the cylindrical region C extends from a first element surface 800 to a cylinder end surface 32A. A locating pin 20A extends along cylinder axis CA from the cylinder end surface 32A.

The second element 12A includes piston 40A, corresponding to that defined by element 40 in the embodiment of FIGS. 3 and 12-15. The piston 40A is bounded by piston sidewall 58A disposed about a piston axis PA. In FIGS. 20A, 20B and 20C, the piston 40 extends from a second element surface 810 to a piston end surface 54A. A bore 52A for receiving the locating pin 20A extends along piston axis PA from the piston end surface 54A. A seal 42A is disposed about the sidewall 58A of piston 40A. Fluidic paths 56A extend from the piston end surface 54A, through the second element 12A, to the port 44A. Three pads 30A extend from the second element surface 810. Only two of the pads 30A are illustrated in FIG. 20A, the third being obscured by piston 40A.

In the embodiment of FIGS. 20A, 20B and 20C, a key element 840 extends outward from the cylindrical end surface 32A in the direction of the cylindrical axis CA. That key element has a predetermined shape transverse to the cylindrical axis CA, for example having three segments as illustrated. Also, the piston 40A has a key region 860 extending inward from the piston end surface 54A in the direction of the piston axis PA. That key region has a predetermined shape transverse to the piston axis PA, which is complementary to the shape of the key element 840, for example having three void segments as illustrated. With this configuration, the piston 40A can only interfit with the cylindrical region C if the angular orientation of the piston 40A is such that the key element 840 and the key region 860 are aligned.

In use, the assembly 10A operates in a manner similar to that described above for the assembly 10. The first element 14A and the second element 12A are brought into proximity and the piston 40A is positioned into the cylindrical region CA. Then, a negative pressure is introduced at port 44A. The negative pressure is coupled via fluidic paths 56A to the region between the piston end surface 54A and the cylinder end surface 32A, whereupon the pressure differential of that region, relative to points exterior to assembly 10A, draws the piston into the cylindrical region CA. The resilient/compliant seal 42A permits the first element 810 and the second element 820 to be coupled with the piston axis PA angularly offset with respect to the cylinder axis CA.

In embodiments including the pads 30A, the first element is drawn toward the second element until the three pads engage the portion of the element opposite the respective pads. When all three pads engage the respective opposing portions, the coupling of the first element and the second element is stabilized.

In embodiments where the first element surface and the second element surface are planar and the three pads 30A are all the same height, then the first element and the second element are coupled with surfaces 800 and 810 parallel and the piston axis PA and cylinder axis CA coaxial. In embodiments with key element 840 and key region 860, when the elements 12A and 14A are rotationally aligned so that the key element 840 and key region 860 interfit, then the elements may be coupled, but not otherwise.

While this disclosure has been particularly shown and described with references to exemplary embodiments thereof, it will be understood by those skilled in the art that various changes in form and details may be made therein without departing from the spirit and scope of the disclosure.

What is claimed is:

1. An assembly for releasably coupling a first element to a second element, comprising:
    A. a first element surface disposed on the first element, and
    B. a second element surface disposed on the second element, and
    C. a port,
    wherein the first element defines a cylindrical region disposed about a cylinder axis orthogonal to the first element surface and extending to a cylinder end surface transverse to the cylinder axis, and having a cylinder side surface disposed about the cylinder axis and extending from the cylinder end surface, wherein the second element includes a piston disposed about a piston axis orthogonal to the second element surface and extending to a piston end surface transverse to the piston axis, and having a piston side surface disposed about the piston axis and extending from the piston end surface, wherein at least one of (i) the first element surface is complementary to the second element surface, and (ii) the cylinder end surface is complementary to the piston end surface, and including a fluidic path extending from the port through one of the (a) piston to the piston end surface and (b) the cylindrical region to the cylinder end surface, and including a resilient seal extending from one of the piston side wall and the cylinder side wall, and wherein:
  i. the piston is sized to be positionable within the cylindrical region with the piston axis being coaxial with, or offset with respect to, the cylinder axis and with the piston end surface being opposite the cylinder end surface, and with the seal extending between the piston side surface and the cylinder side surface, thereby forming a pneumatic seal between a region between the piston end the surface and the cylinder end surface, whereby the region is pneumatically isolated from points exterior thereto, and
  ii. the first element surface and the second element surface are sized and disposed on the respective first element and second element, a whereby when the piston is at least partially disposed in the cylindrical region, at least a portion of the first element surface is opposite at least a portion of the second element surface.

2. An assembly according to claim 1, further including three pads, each of the pads extending from opposed portions of one of: (i) one of the first element surface and the cylinder end surface, and (ii) one of the second element surface and the piston end surface.

3. An assembly according to claim 2, wherein the pads have equal heights.

4. An assembly according to claim 2, wherein at least two of the pads have different heights.

5. An assembly according to claim 2, wherein at least one of the pads has an adjustable height.

6. An assembly according to claim 2, further comprising:
a controller for selectively applying a negative pressure relative to ambient pressure, and a positive pressure relative to ambient pressure, to the port,
whereby when the first element and the second element are positioned whereby the first element surface is opposite the second element surface, with the piston disposed at least partially within the cylindrical region, and the negative pressure is applied to the port, the first element surface and the second element surface are drawn towards each other in response to the applied negative pressure and the three pads maintain separation of the surfaces through interfering engagement of each of the pads with one of the first element surface and the second element surface, thereby coupling the first element and the second element and
whereby when in the first element and the second element are positioned whereby the first element surface is opposite the second element surface, with the piston disposed at least partially within the cylindrical region and the three pads maintain separation of the surfaces, and the positive pressure is applied to the port, the first element surface and the second element surface are driven away from each other in response to the applied positive pressure, thereby decoupling the first element and the second element.

7. An assembly according to claim 1, wherein at least one of the first element surface and the second element surface are planar.

8. An assembly according to claim 1, wherein both of the first element surface and the second element surface are planar.

9. An assembly according to claim 1, further including an alignment assembly having a first component extending from one of the first element surface and the cylinder end surface along a first alignment axis parallel to the cylinder axis, and a second component extending from one of the second element surface and the piston end surface along a second alignment axis parallel to the piston axis,
wherein, when the piston is at least partially in the cylinder region, with the piston axis being substantially coaxial with the cylinder axis, and having a predetermined angular orientation with respect to the piston axis and the cylinder axis, the first alignment axis and the second alignment axis are substantially coaxial, and
wherein the first component and the second component are shaped to interface when the first alignment axis and the second alignment axis are substantially coaxial.

10. An assembly according to claim 1,
wherein the first element surface is parallel to the second element surface when the piston axis and the cylinder axis are coaxial, and
wherein the first element surface comprises the cylinder end surface and the second element surface comprises the piston end surface.

11. An assembly according to claim 1,
wherein the first element surface is parallel to the second element surface when the piston axis and the cylinder axis are coaxial,
wherein the first element surface extends outward from an end of the cylindrical region opposite the cylinder end surface, and
wherein the second element surface extends outward from an end of the piston opposite the piston end surface.

12. An assembly for releasably coupling a first element to a second element, comprising:
A. the first element, and
B. the second element, and
C. a port,
wherein the first element defines a cylindrical region disposed about a cylinder axis and extending to a cylinder end surface transverse to the cylinder axis, and having a cylinder side surface disposed about the cylinder axis and extending from the cylinder end surface,
wherein the second element defines a piston disposed about a piston axis and extending to a piston end surface transverse to the piston axis, and having a piston side surface disposed about the piston axis and extending from the piston end surface,
wherein the cylinder end surface is complementary to the piston end surface, and
including a fluidic path extending from the port through one of the (a) piston to the piston end surface and (b) the cylindrical region to the cylinder end surface, and
including a resilient seal extending from one of the piston side wall and the cylinder side wall, and
wherein:
  i. the piston is sized to be positionable within the cylindrical region with the piston axis being coaxial with, or offset with respect to, the cylinder axis and with the piston end surface being opposite the cylinder end surface, and with the seal extending between the piston side surface and the cylinder side surface, thereby forming a pneumatic seal between a region between the piston end the surface and the cylinder end surface, whereby the region is pneumatically isolated from points exterior thereto, and ii. the first element and the second element are sized whereby when the piston is at least partially disposed in the cylindrical region, at least a portion of the first element surface is opposite at least a portion of the second element surface.

13. An assembly according to claim 12, further including three pads, each of the pads extending from opposed portions of one of (i) the cylinder end surface, and (ii) the piston end surface.

14. An assembly according to claim 13, wherein the pads have equal heights.

15. An assembly according to claim 13, wherein at least two of the pads have different heights.

16. An assembly according to claim 13, wherein at least one of the pads has an adjustable height.

17. An assembly according to claim 12, further including an alignment assembly having a first component extending from the cylinder end surface along a first alignment axis parallel to the cylinder axis, and a second component extending from the piston end surface along a second alignment axis parallel to the piston axis, wherein, when the piston is at least partially in the cylinder region, with the piston axis being substantially coaxial with the cylinder axis, and having a predetermined angular orientation with respect to the piston axis and the cylinder axis, the first alignment axis and the second alignment axis are substantially coaxial, and wherein the first component and the second component are shaped to interface when the first alignment axis and the second alignment axis are substantially coaxial.

18. An assembly according to claim 12, wherein the cylinder end surface is parallel to the piston end surface when the piston axis and the cylinder axis are coaxial.

* * * * *